(12) United States Patent
Biton et al.

(10) Patent No.: US 9,881,434 B2
(45) Date of Patent: Jan. 30, 2018

(54) INTELLIGENT PORTABLE OBJECT COMPRISING GRAPHICAL PERSONALIZATION DATA

(75) Inventors: Philippe Biton, Augagne (FR); Gérald Maunier, Sanary (FR); William Berges, Aubagne (FR); Daniel Boucher, Quebec (CA)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/131,453

(22) PCT Filed: Nov. 27, 2009

(86) PCT No.: PCT/EP2009/065975
§ 371 (c)(1),
(2), (4) Date: Aug. 5, 2011

(87) PCT Pub. No.: WO2010/060986
PCT Pub. Date: Jun. 3, 2010

(65) Prior Publication Data
US 2012/0023422 A1    Jan. 26, 2012

(30) Foreign Application Priority Data
Nov. 28, 2008   (EP) .................................. 083058743

(51) Int. Cl.
*G06F 3/048*       (2013.01)
*G07C 9/00*        (2006.01)
*G06K 19/077*      (2006.01)

(52) U.S. Cl.
CPC .......... *G07C 9/00119* (2013.01); *G06F 3/048* (2013.01); *G06K 19/07703* (2013.01)

(58) Field of Classification Search
CPC ....................................................... G06F 3/048
(Continued)

(56) References Cited

U.S. PATENT DOCUMENTS 5,884,271 A  *  3/1999  Pitroda ............................. 705/2
7,154,452 B2 * 12/2006  Nakamura et al. ............ 345/1.1
(Continued)

FOREIGN PATENT DOCUMENTS

EP           1 643 464 B1    3/2011
WO      WO 2006/023311       3/2006
                A23
(Continued)

OTHER PUBLICATIONS

*International Search Report (PCT/ISA/210) dated Mar. 12, 2010, by European Patent Office as the International Searching Authority for International Application No. PCT/EP2009/065975.
(Continued)

*Primary Examiner* — Xuyang Xia
(74) *Attorney, Agent, or Firm* — Buchanan Ingersoll & Rooney PC (57) ABSTRACT

The invention relates to an intelligent portable personal security object including graphical personalization data visible from a face of the object, wherein the graphical personalization data are presented by electronic display. The invention also relates to a use of the portable object in the carrying out of secure electronic transaction; and/or in the authentication and visual monitoring of at least one person; and/or in logical access control for at least one user; and/or in the displaying of data other than graphical personalization data.

20 Claims, 4 Drawing Sheets

(58) Field of Classification Search
USPC .......................................................... 715/764
See application file for complete search history.

(56) References Cited

U.S. PATENT DOCUMENTS

| | | | | |
|---|---|---|---|---|
| 8,317,096 | B2* | 11/2012 | Mysore .......................... | 235/382 |
| 2003/0112259 | A1* | 6/2003 | Kinjo ................. | H04N 1/00307 |
| | | | | 715/700 |
| 2004/0255081 | A1* | 12/2004 | Arnouse ........................ | 711/115 |
| 2006/0065741 | A1* | 3/2006 | Vayssiere ...................... | 235/492 |
| 2006/0091223 | A1* | 5/2006 | Zellner et al. ................ | 235/492 |
| 2006/0095647 | A1 | 5/2006 | Battaglia et al. | |
| 2006/0136762 | A1* | 6/2006 | Yoshioka ............. | G09G 3/3406 |
| | | | | 713/320 |
| 2006/0227122 | A1* | 10/2006 | Proctor ................... | G09G 3/20 |
| | | | | 345/204 |
| 2007/0213090 | A1* | 9/2007 | Holmberg ........... | G06F 3/04886 |
| | | | | 455/550.1 |
| 2008/0136161 | A1* | 6/2008 | Leenders et al. ............... | 283/94 |
| 2008/0165398 | A1 | 7/2008 | Jagt et al. | |
| 2008/0254822 | A1* | 10/2008 | Tilley ........................ | 455/550.1 |
| 2008/0296367 | A1* | 12/2008 | Parkinson ..................... | 235/380 |
| 2008/0314971 | A1* | 12/2008 | Faith et al. .................... | 235/379 |
| 2009/0033488 | A1* | 2/2009 | Suzuki et al. ................ | 340/540 |
| 2009/0069050 | A1* | 3/2009 | Jain et al. ..................... | 455/558 |
| 2009/0201271 | A1* | 8/2009 | Michiyasu et al. ........... | 345/204 |

FOREIGN PATENT DOCUMENTS

| | | |
|---|---|---|
| WO | WO 2007/003249 A1 | 1/2007 |
| WO | WO 2007/004140 A1 | 1/2007 |

OTHER PUBLICATIONS

*Written Opinion (PCT/ISA/237) dated Mar. 12, 2010, by European Patent Office as the International Searching Authority for International Application No. PCT/EP2009/065975.

* cited by examiner

INTELLIGENT PORTABLE OBJECT COMPRISING GRAPHICAL PERSONALIZATION DATA

The invention relates to the field of intelligent portable personal data including graphical personalization data visible from one face of the object.

It more particularly relates to the field of security (or official) portable objects enabling a visual identification such as identity documents as cards, sheets or any other format.

It more particularly relates to the field of security objects enabling an identification or authentication of persons or personal goods supporting, if need be, applications for the physical and/or logical access control of a person with respect to a computer system. Typically, the security object can be a chip card or have the shape of a chip card.

Graphical personalization data means data which are generally printed on security portable objects, such as chip cards, passports, identity cards, data specific to a user, the holder of the object, directly or indirectly related to him/her, the data which are likely to change from one object to another during the step of transferring data onto the object, more particularly through a method of graphical printing during the manufacturing or personalization of the object. These must thus be differentiated from data generally printed on books, magazines, periodical press, labels. Within the scope of the invention, the displayed personalization data can be fixed as on traditional documents (name, photograph), but also variable (age, access right, credit, . . . ) while remaining certified by a trustworthy third party (for example the chip card) on behalf of an authority (state, bank, company).

The invention finds an application more particularly in the carrying out of secured electronic conversions such as payments using a portable security object. Payments can be locally carried out using payment terminals or on line on the Internet in relation with commercial sites or servers or associated processing unit whether distant or not.

Although it is described while relating with an exemplary financial transaction, the word transaction indicates any bidirectional exchange between the portable object and a processing unit. Such exchanges make it possible for example to consult a database, secured personal bases, to have access to shared files, downloading, access control . . . .

As regards documents or identity papers, the holders are led to having several specific documents or cards for each one of the identifications or utilisations, such as driving licence, health service card, identification card, transport card. Such cards or documents are generally issued by an entity or an authority such as the government or the representative thereof (embassy, consulate, prefecture, social security) and can have a life requiring an updating or renewal (resident's permit, health service card).

As the issue and the renewal of such (printed and optionally electronically personalized) documents, sometimes carried out in batches or individually, can be long, tedious and expensive to be implemented, the invention more particularly aims at solving such drawbacks.

On the other hand, as regards the field of physical and/or logical access control, large companies usually use chip cards for the logical access control and/or the physical access control. The ISO format with the printed information relating to the user (photograph, name, identification) is well adapted for the visual identification and for radiofrequency physical access control using radiofrequency driver in particular.

However, this ISO format is not well adapted for logical access controls, more particularly to computer systems or databases, since it requires using drivers on the user's systems such as computers.

This is the reason why USB keys integrating an associated chip card have been used and have rapidly been preferred for the logical access control through a simple connection to an existing USB port on the computer.

The inventors imagined that, when taking into account both the physical and logical constraints of the access control, the best product would be a USB key preferably with an integrated chip card, a few capacities of contactless communication and capable of presenting the user's identification for visual identification.

However, whereas on the current ISO chip cards the photograph is printed on the card body itself in order to enable the user's security control by a security agent, on the current USB keys, no photograph of the user is shown today since technical problems are still to be solved (there is no much room for a graphic printing on the USB keys since the shape is not necessarily plane and it can easily manipulated by a printing machine).

Among the portable objects capable of displaying information, cards are also known which include screens covering a large part of the surface of the card and make it possible to display alphanumerical information such as electronic books.

Among the intelligent portable objects, chip cards are known more particularly for displaying transaction balances, memory contents, an OPT (one-time-password) number. Such cards can be autonomous and have a battery and a button for actuating the generation of the OTP. Some cards contain a display device of the electronic paper (E-Paper) or bistable type to present alphanumerical information.

Supermarkets or display electronic labels including a display device and having an interface capable of receiving information more particularly relating to price and update through a radiofrequency communication with a data downloading central unit.

Communicating portable devices are also known, such as personal assistant devices (PDA) including touch display devices such as the "iPhone" by the Apple Company.

Among the electronic transaction applications, card reading payment terminals capable of carrying out an electronic transaction are known. Such terminals are likely to have Trojan horses and cannot provide a sufficient guarantee and security for a user.

Touch display devices are also known, which offer a total interaction with the user. On the other hand, display devices using the E-Paper (electronic paper) technology have flexible screens.

The invention aims at solving the above-mentioned drawbacks.

The present invention more particularly aims at providing a portable object including a graphical personalization visible from one face of the object and the reissue or renewal of which is facilitated.

Another objective consists in providing a physical and/or logical access control enabling a visual authentication.

Another objective consists in providing security objects which have a practical utilisation.

Another objective consists in authorising at least one use other than one presentation of the graphical personalization, more particularly for visual monitoring.

Another objective consists in improving the security of electronic transactions.

The principle of the invention consists in designing a security portable object which enables an electronic display of personalization graphical data. The invention also consists in executing graphical personalization electrically.

The invention also consists in using the surface reserved for the display of personalization graphical data for other functions, more particularly the display of other data, an interaction (IHM Man Machine Interface), a signature block, a secured PIN code keyboard, etc.

The steps of graphical and/or electrical personalization of intelligent portable supports can be replaced by one single step of electronic personalization and thus the issue and renewing of an official document are facilitated, they are quicker and less expensive.

For this purpose, the invention relates to an intelligent portable security object including graphical personalization data visible from one face of the object. The object can be distinguished in that the graphical personalization data are presented by electronic display.

The person skilled in the art of graphical personalization is prejudiced and will carry out a graphical personalization only by printing and not electronically. A major part of security is provided by specific printing (guilloches, marking, hologram, etc., which come along with a person's photograph).

According to one characteristic, the object is an object allowing a person's visual authentication, with the graphical data including a photograph of the person.

As the identification documents or authentication objects must, by nature, enable a visual monitoring by one authority at any time, the person skilled in the art in principle has the prejudice of the constraint of a permanent graphical presentation incompatible with an electronic presentation. And a priori the graphic must not be likely to be erased or replaced or modified. Therefore, security elements are intimately mixed with graphics and/or supports such as guilloches or holograms, or hidden marks.

According to another characteristic, the object provides a logical access control function. Then, the same object provides a double security function in that it enables a visual and logical access control. The data enabling this security can be coupled or matched together into one or two coupled or matched circuits for a greater security as explained hereinafter.

According to another characteristic, the graphical data are securely stored in internal or external storing means connected thereto. Then, for the storage, the invention preferably uses a component which is, by nature, physically and/or logically secured such as chip cards; data can be enciphered in one component. The integrity or authenticity of the component can be controlled as explained hereinunder. The component can be located in the object or connected thereto.

According to one embodiment, the object further enables the display of personalization graphical data or the display of other data. Then, the object is particularly practical since it provides, in addition to the function of a visual monitoring, that of a screen which can display any other thing in addition to or instead of same, under certain conditions.

In a particularly practical embodiment, the object shows or constitutes one or several security or official document(s); a second graphic stored can also be a personalization graphic. The object is practical since it groups at least two identity or official documents on only one support.

According to other characteristics, the aim is selected among a USB key 1a, a chip card 1c, 1d, a personal assistant (PDA), a mobile telephone. The key, the assistant and the telephone may include the welded or connected security component, and the component can have the shape of an independent component or element, more particularly as a chip card, an SD card or an MMC . . . .

Thanks to the invention, an intelligent personal object, such as the mobile phone, also constitutes or includes a graphical personalization and/or visual authentication object thus avoiding having to carry multiple objects.

It is also practical insofar as, thanks to the invention, a surface which was previously reserved for the presentation of a photograph, or other printed graphical data, can at least be used in a second way which is the presentation of other information. Then, it is useless to have two separate objects, for example, on the one hand a badge and on the other hand a device containing a display. The invention makes it possible to assemble such two devices into one.

According to other characteristics, the object includes two display control means 100, 200 capable of keeping or returning to the display of priority graphical personalization data under certain predetermined conditions.

The display control means include means for configuring and/or detecting predetermined conditions such as low battery, mechanical failure, vertical position, micro display or multiple display, connection to a source of energy.

According to other characteristics, the personal object includes means for configuring and/or detecting predetermined conditions such as low battery, mechanical failure, vertical position, micro display or multiple display, connection to a source of energy.

According to other characteristics, the display is bistable such as electronic paper (E-Paper); the display is a touch display; the display includes or composes the above object.

The object of the invention is also a method for personalizing an intelligent portable security object, said method including a step consisting in transferring graphical personalization data visible from one face of the object. The method is characterised in that the graphical data is transferred in numerical form and/or as a personalization marking onto the above object and the digital data are presented to the outside by electronic display.

The invention also aims at a device including an interface connected to a display device; it is characterised in that the display device includes the above-mentioned object. The display may be removable with respect to the device and be an additional display of the device and/or its own unique display.

Another aim of the invention is also the use of the above-mentioned complying or obtained portable object,
  in the carrying out of secure electronic transactions;
  and/or in the authentication and visual monitoring of at least one person;
  and/or in logical access control for at least one user;
  and/or in the displaying of data other than classical personalization data;
  and/or an electronic signature.

To carry out an electronic transaction including an exchange of data between a remote processing unit connected to a portable object, the transaction implementing a step of displaying all or a part of the information useful for the transaction to a user, and/or a step of interaction between the card and the user, the displaying and/or the interaction being carried out via said interactive display.

Thus, the invention makes it possible for a user to have a portable object which can be used for the physical identification, the physical access visual control and the logical access electronic control, more particularly through a simple connection into an existing port or any other port.

A document which can be used for multiple identifications or utilisations can easily be used and can be interactive with the user (for example, the user could see the points in his or her driving licence and its prescriptions for drugs or care.

Common information intended to be displayed, such as an identity photograph or any other photograph, the address, the birth date, the allergies, the blood group can be contained in an electronic file and be shared by several identification or information display applications. The content can be interactively shown upon the user's request or a request from another member or another person, such as a controller, a customs officer, a bank, a national health office, the police, etc.

The display can also be used for making a digital signature (display of an extract from a chip card-controlled transaction), the on line or off line generation of an OTP.

Other characteristics and advantages of the invention will appear upon reading the description which is given as a non limitative example and referring to the appended drawings, wherein.

Figure 1:
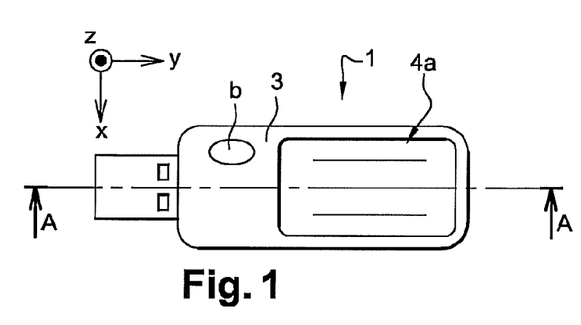
FIG. 1 schematically shows one embodiment of the object according to the invention.
Figure 2:
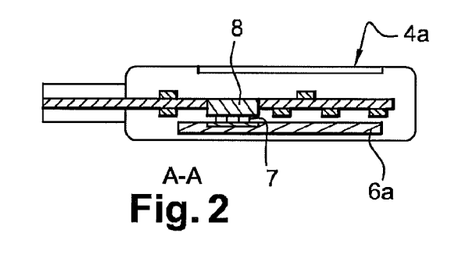
FIG. 2 shows a cross-sectional diagram along A-A of the object in FIG. 1.

In FIG. 1, an intelligent portable personal object 1, 1a is shown as a USB key, but it can take any other shape, such as a chip card, as illustrated hereinunder.

The object includes graphical personalization data 2 visible by the human eye from one face 3 of the object. Preferred personalization data are here a photograph of the user or of the holder of the key. The data may also include information belonging to the holder, such as the name, an identification number, the name of the company or the service which he or she belongs to.

Such data, which were knowingly liable to be usually directly printed onto the shell of the object, on the outside, or in a paper medium introduced inside under a transparent window, are electronically displayed according to one characteristic of the invention.

For this purpose, the object includes display means such as a screen 4, 4a and a display microcontroller, preferably of the graphical type in order to manage their display operations. Displaying the user's picture makes it possible to visually check that the holder is the correct person, as well as a company badge bearing a photograph.

The object is preferably able to carry out a logical access control 2. The logical access is more particularly the access to a network or to data stored and managed by access rights, a connection via a computer, the use of which is under control through the checking of a PIN code or a password.

Rights of use, of access, protected if need be by enciphering keys may be introduced into a component fixed to the PCB or into an associated medium which is connected thereto, such as a chip card (6a). Graphical data to be displayed can be stored in the same component or another component matched with the one containing the rights of access. The component here is an integrated circuit chip.

Thus, in case the chip containing the graphical data is substituted, all or part of the rights providing security and the operation of the portable access (rights of access, password, enciphering keys, etc.) are also erased, which thus makes the counterfeited object unusable for logical access.

Matching the card 6 or 6a and the key 1, 1a or any other object may more particularly request means for carrying out a mutual authentication between matched object and/or a sharing of functions required for operating the object.

According to an advantageous characteristic, the object 1, 1a includes means capable of keeping or returning to a priority display mode of the graphical personalization data under some conditions of use.

Figure 3:
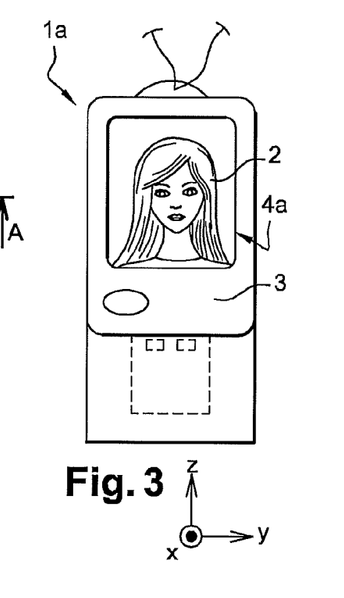
FIG. 3 illustrates a use of the object in vertical position.

More particularly, when the object is in a particular position, preferably a vertical position in the direction Z (according to the X, Y, Z reference system), this means that it is used in the badge function and the picture is automatically displayed on the screen. Therefore, detection means, more particularly of the gyroscopic type, inform a microcontroller in the object which, in response, controls the display of the portrait. As soon as the object leaves the vertical position, the portrait can be replaced for another use.

In another utilisation, more particularly a horizontal utilisation (in the X, Y plane), or a position different from the vertical, this may mean that the device is not used and in this case the portrait display is switched to a standby or a saving mode so as to save energy.

The object may also include means for detecting particular conditions of utilisation or environmental conditions. Then, in case the battery is low or a mechanical failure occurs, the object may be switched to another mode, such as a saving mode or priority mode or micro display mode. This mode may be pre-programmed or selected from an interactive menu.

A micro display or forced display mode for priority graphical data can be imparted by the micro control when one of the above-mentioned cases occurs.

Then, the essential function of the physical access control by the object may be maintained even with a low battery, as soon as a battery level below one given threshold is detected.

Figure 8:
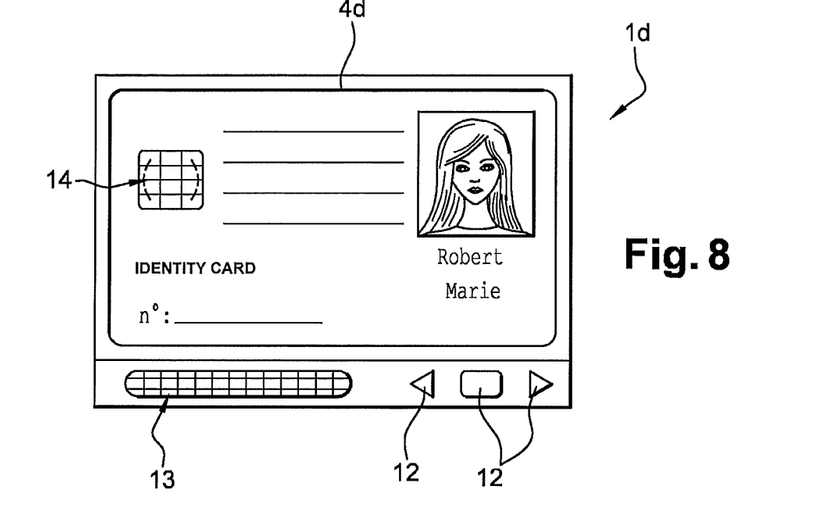
FIG. 8 illustrates the object of the invention according to a fourth embodiment as a card with browsing means, an interface and an autonomous source of energy.

When this mode is triggered and operated, it is no longer possible to voluntarily change the display by operating the b button or any other interactive means 12 for example as appears in FIG. 8.

The display can be selected among a so-called electronic paper (E-Paper) technology or with bistable liquid crystals which have the advantage of consuming little or no energy.

According to one characteristic, the display is advantageously a touch display, which makes it possible not only to save space for the screen on the visible face of the object but also to secure exchanges as will be explained hereinunder.

Instead of a graphical personalization, the personal object is submitted to an electrical personalization to download data specific to the holder and also data aiming at authorising logical access, security (private keys, rights, etc.).

According to a practical embodiment, the object is totally or partially operated with another associated object, such as a chip card 6a which is connected thereto more particularly through a connector on an electric contact interface 7 or even a radiofrequency interface or any other interface.

In this case, the electrical personalization mentioned above is preferably carried out directly onto the object especially when the latter is a chip card using the better adapted personalization tool of the chip card field.

The card is then inserted into a slot in the object, more particularly through a back slot. The chip card can provide logical access control functions with the best possible safety thanks to its structure which is particularly adapted and thanks to enciphering keys and/or algorithms that it can implement. The card display is centred on the opening so that it cannot be seen whether this is a card.

Figure 4:
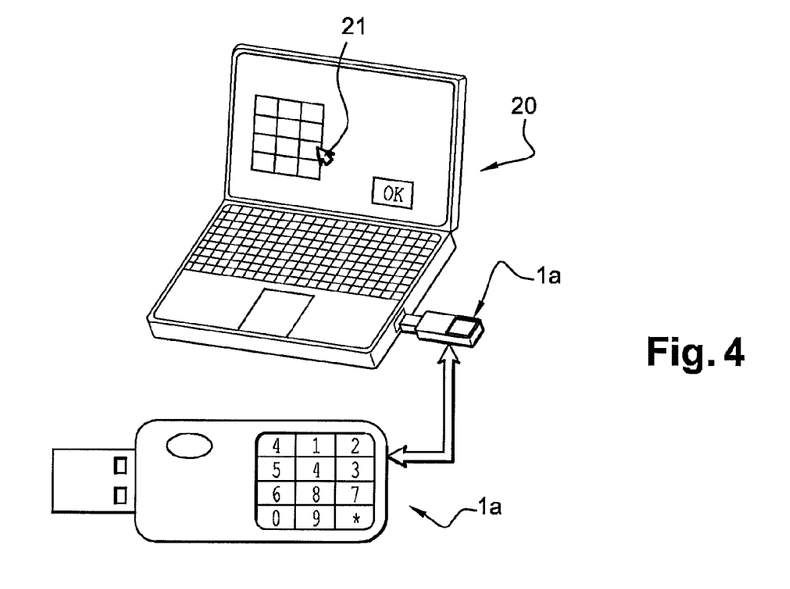
FIG. 4 illustrates a use of the invention for a logical access or an electronic transaction.

In FIG. 4, a use of the USB key makes it possible to securely enter data on the screen of a computer 20. Data here is a PIN code for carrying out a transaction, more particularly on the Internet.

During the transaction, a window is displayed on the computer's screen and here shows a keyboard of a PIN code without displaying the numbers in the blocks.

In parallel, the key according to the invention is connected to a port of the computer and receives data for displaying the real keyboard which is displayed on the screen of the key 1a.

The transmission of the real keyboard may have required the implementation of previous security operations of known types, such as the opening of a secured communication session with the emitter of the keyboard of the PIN code, an authentication of the object by a bank or any other authority, a step of deciphering the enciphered keyboard by an enciphering key contained beforehand or generated immediately.

Thus, in order to enter his or her PIN code on the computer screen, the user uses the pointer 21 of the computer mouse to select and click on the block corresponding to those displayed by the key. The user thus prevents his or her PIN code to be attacked through the keyboard, the mouse pointer or the screen.

Figure 5:
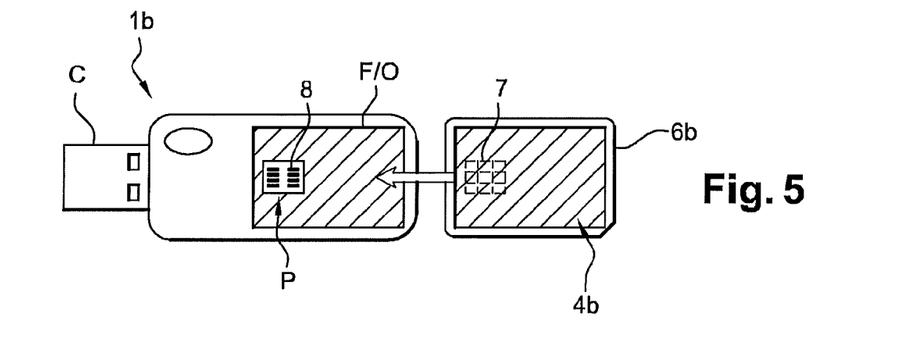
FIG. 5 schematically shows a second embodiment of the object according to the invention, associated with a card being introduced to a functional position.
Figure 6:
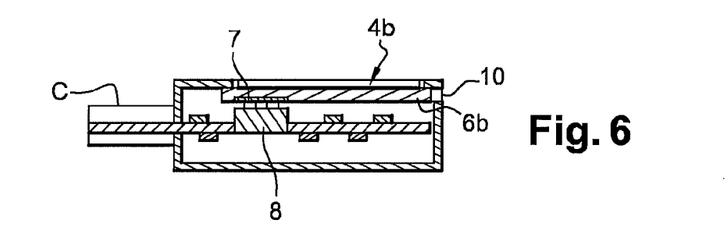
FIG. 6 shows a longitudinal cross-sectional diagram of the object in FIG. 5, with the card being in a functional position.

In a more elaborate mode, the object display device is interactive as in the example shown in FIG. 5, 6 or 8. The transaction session can be carried out as mentioned above or preferably directly between an authority (secured server) and the object of the invention.

The keyboard is displayed on the interactive screen and the user selects or enters his or her code directly on the screen of the object instead of selecting it on the computer screen. This makes it possible to still improve security since the selection is carried out within a trustworthy object and within the chip card. The entered PIN code is seized by the card and the transaction enciphered by the card before being transmitted directly to the authority.

A communication can be directly established between the object and a distant server or be relayed by a terminal used as an interface. More particularly, the card may implement an IP protocol for conversing on the Internet or be read by a terminal. This operation mode may not request the displaying of graphical personalization data, such as a portrait.

For this purpose, for a use for secured electronic transactions in the broadest sense (whether financial or not), the object may include one security module component, such as an integrated circuit chip of the same type as that of the chip cards. This component more particularly includes enciphering means and a key storage memory and/or an enciphering/deciphering algorithm the access to which is protected. It may include means for generating a key or a number of the OTP type for a single use in time.

This security component is interesting because of its capacity to resist physical and/or logical attacks more particularly, that of Trojan horses. This component may be welded on a circuit or connected otherwise for composing the object of the invention. Thus, for example, a personal assistant PDA with an interactive screen or of the type which can be compared to the interactive device communicating, such as an iPhone of the Apple Company, may be used as the basis for carrying out the invention or at least the above-mentioned mode by including the component described above and the functions described above.

In an even more practical way, according to a preferred alternative solution illustrated in FIG. 5, the card 6b is associated with the portable object 1b, such as a USB key, which includes a display 4b and which executes displays for the portable object.

The card is for example introduced into the receiving object through an adapted access, here a slot 10, located at the back of the body of the object. It is connected in a known way to an electronic circuit of the object more particularly through a connector 8 connecting the electric contact paths 7. The card may be introduced into and positioned in the receiving portable object, so that it cannot be seen that the screen is supported by a removable card. In particular because the screen only is visible further to the centring thereof in a window or further to the opening of the receiving object.

The logical access rights, more particularly the subscription of a telecommunication operator for a radiotelephony application, access rights to any commercial service are in the card. They can also be in the key or distributed among both. Connecting means C, more particularly here a USB connector, make it possible to establish a connection with external means to carry out a logical access control.

The card displays the personalization data with its own display 4b. It is introduced into one space provided in the key and which is in the functional position for, on the one hand, connecting to the key and on the other hand, centring the display 4b with respect to a window border F/O which can be opened or, as here in the example, closed by a transparent wall P.

The card thus enables physical controls of the accesses by visualisation of the holder's portrait.

The invention enables a physical access control implementing a double step of control. The physical access control includes the user's authentication control by the portable object, more particularly through biometry and a physical access control of the rights of access contained in the portable object.

If need be, the object may include a detector of the biometric type or a print detector to check, at selected or random times, the presence of the real holder. In order to prevent frauds consisting in stealing the object to have access to rooms which are accessible only upon presentation of a contactless badge to a radiofrequency terminal and through the visual monitoring of the person representing one authority, the invention enables this double access control with the holder showing not only his or her picture but also carrying out a confirmation of presence by biometry on the place of control by an authority.

If the biometric authentication by the object fails, an indicator makes it possible to know whether a fraud is occurring, for example by locking the logical access and more particularly displaying an authentication failure message on the screen of the object, more particularly that of the card, or in logically locking the card. The logical message or lock can be received by human or electronic control means.

The portable object can be additionally supplied otherwise than by radiofrequency and is authorised at least for a short time to have a subsequent physical access control through an access terminal. According to an alternative solution, the holder is authenticated with respect to the card in front of a more particularly radiofrequency terminal so as to collect energy for an authentication and more particularly a biometric authentication process, and shows the object to the terminal for the rights of access to be controlled. The access is authorised if rights of access are present and if the holder has been correctly identified.

As an alternative, the holder shows his or her card to a radiofrequency access control terminal. The user's print is selected by the card immediately thanks more particularly to the energy of the driver communicated to the contactless card; the card communicates the sampled print as well as a personalization print pre-stored in the card to the driver, so that it can carry out a comparison and authorise access if need be if the driver finds the accesses to the card, during a radiofrequency exchange. Of course, the card (or portable object) includes the interface and contactless communication means which are appropriate.

Figure 7:
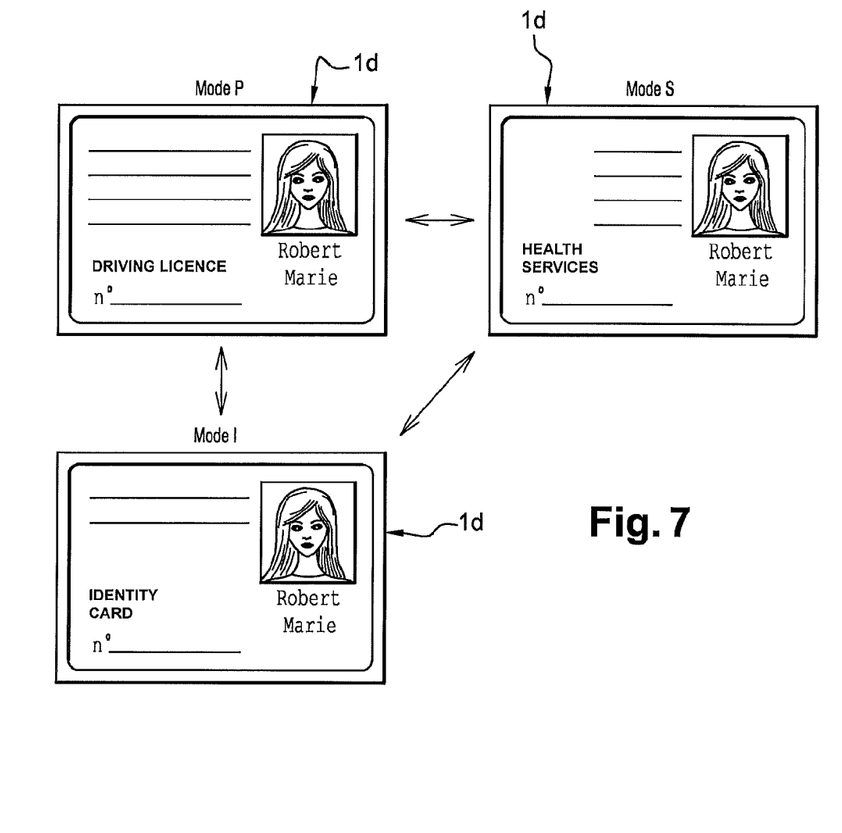
FIG. 7 illustrates the object of the invention according to a third embodiment in the form of a card.

In FIG. 7, according to another embodiment, the object is in the form of a chip card 1d. The card includes a display which substantially covers the whole or almost the whole of the card surface, for example 90 to 100% of its surface.

The display is selected among an electronic paper (E-Paper) technology which has the advantage of not consuming energy for keeping the display on.

The card includes a microcircuit for interfacing with graphical personalization means but according to the invention, this operation which is generally executed by conventional printing means (inkjet, offset, silk printing) is executed electrically or by radiofrequency. Data is transferred in numerical form and presented to the outside by electronic display.

The card may include a battery or means making it possible to receive energy for changing the display at least during the step of graphical personalization.

Battery may be rechargeable, the card may include means for collecting energy, such as photovoltaic sensors 13, if need be. A simple lighting with an electric lamp, more particularly during control, enables the displaying or a change in the display. According to an alternative solution, the card may include other supplying means which can also be used for a communication like a radiofrequency antenna. Then, at a control station, it is sufficient to send energy and, if need be, a code for displaying graphical data to be controlled.

Such a card is preferably an object for the visual monitoring of a person by more particularly displaying the portrait thereof and makes it possible to carry out a physical access control.

The card can also be used to carry out a logical access control or an electronic control like in electronic passports.

In order to make sure that the display controller has not been replaced by a forged one, the invention may include electronic authentication means, for example for implementing an authentication process between an appropriate driver and the chip existing in the card in order to provide a visual and electronic control. If need be, a number may be engraved, printed or displayed on the card and participates in authentifying the card as well as electronic passports.

The interface may be a contact, contactless and more particularly radiofrequency interface. In the example, a graphic controller drives the displaying of data and a chip controls the interface with the outside. The chip may include, if need be, a micro antenna provided thereon, more particularly engraved or integrated on silicon. During a personalization operation, both controllers (the graphical one and the one on the chip having the external interface) may implement a previous mutual authentication process so as to enable a change in the display or to authorise the display. Only one component provides the above-mentioned functions, if need be.

In an embodiment, the object includes interactive means so as to interact with the user. More particularly, such means may include browsing buttons 12 (FIG. 8) making it possible to change the display or the card operating mode.

According to one characteristic, the object is capable of displaying at least two graphics each one corresponding to a different document. Both graphics may compose at least two users' own documents, such as an identity document and a health document or any other official document issued by an authority.

Referring again to FIG. 8, the card 1d is in "I" mode and constitutes an identity document: a resident's permit, a passport, an identity card and in this mode all the required information and more particularly a picture and a number, an address, a birth date, a date of validity are displayed.

In response to a manual pressure on at least one of the buttons 12, the card controller displays another mode P, and another official identity document is displayed, i.e. a driver's licence. Another pressure on the button switches to the S mode which corresponds to the displaying of the data required for a health card.

Then, only one document or medium makes it possible to replace several visual media which are contained in a user's wallet.

Advantageously, the photograph file is not modified and is shared by the other modes thus contributing in consuming less energy. Other data can be shared, such as the name, the address, etc.

Specific data, such as "Licence", "Health", "Identity", "date of validity", "card number" can be written in separate files and displayed on request whereas the other non common data no longer are.

Advantageously, the interactive means are touch means and are composed of a sensitive layer opposite the display and preferably below same. In one example, switching can be made from a P, S, I display or mode to another one by successive pressure on the touch screen or any other switch more particularly placed at the back of the object. The picture or priority data, for example, relating to identity, may return to the display after a predetermined time of non utilisation or a pressure on a display switch control. The object includes an adequate programme and mechanism which can carry out the above-mentioned function.

As the identification documents are, by nature, intended to be permanently displayed for a control at any time, the invention provides for one embodiment wherein the screen may display another thing, as mentioned hereinunder.

Figure 9:
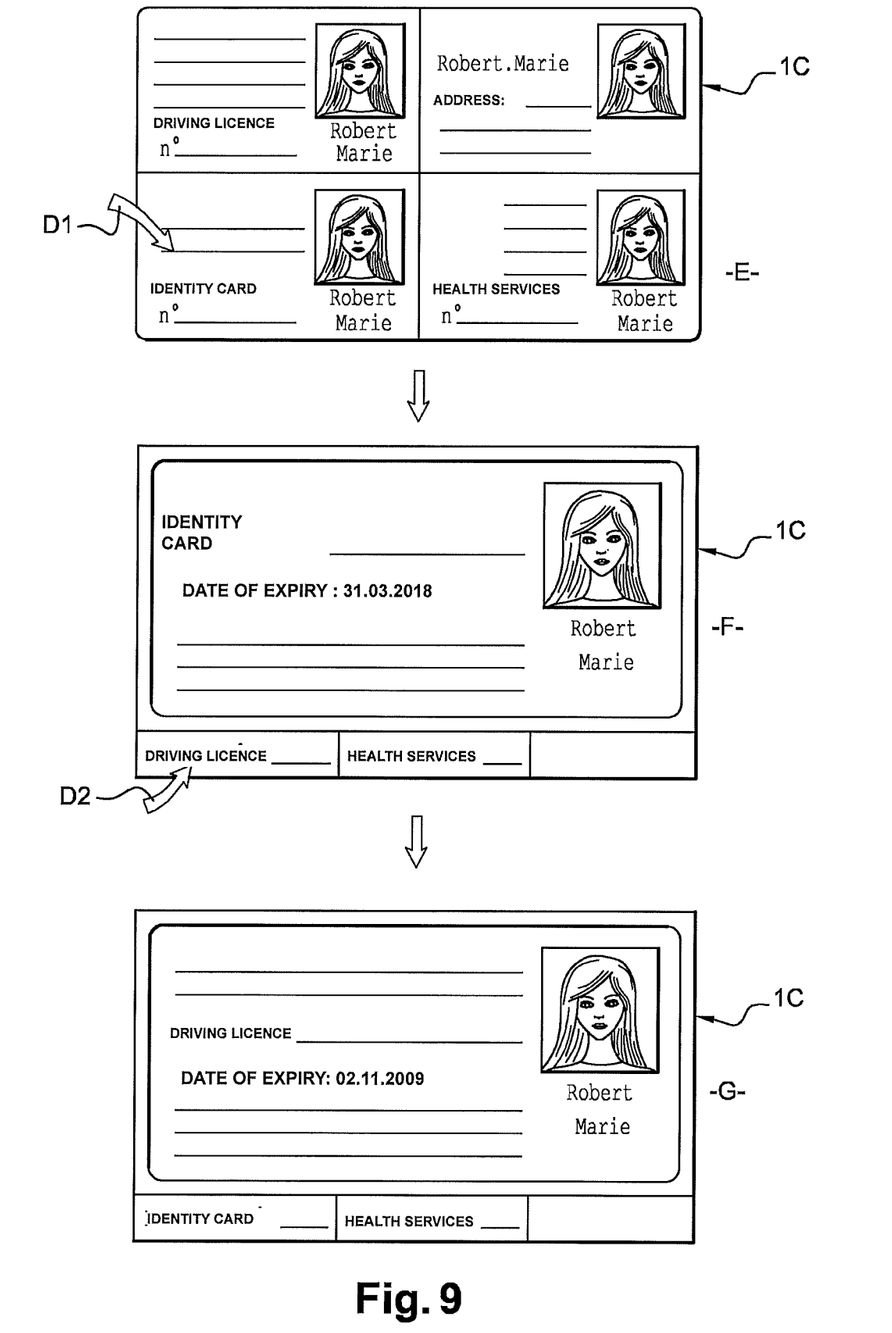
FIG. 9 schematically illustrates a fifth embodiment of the object according to the invention.

According to this mode illustrated in FIG. 9, the card has many windows which each contain a document in a reduced format. Such windows can be read with a naked eye or using a magnifier if so required. The reduction may however be executed so that a normal reading is possible. Such formats may include essential data from each document, such as a number which can be checked by an authority in a base.

By pressing on one of the interactive windows, more particularly the "identity" window in the example D1, the card magnifies the format of the identity document selected in configuration E to a configuration F. The other windows relating to the "Licence" and "Health" can be reduced more particularly as regards the lower margin. A number making it possible to find the data in a basis remains displayed in the margin.

Starting from this F configuration of the card, it is possible to display the licence by pressing D2 in a corresponding bookmark or window and leads to the displaying of the licence in a large format in configuration G.

The card may include a standby mode wherein after some time of non utilisation, the card displays a default or priority configuration, for example E. The card could then display by default one of the documents, such as the identity card in a larger format.

According to another characteristic, the object may include reduction/magnifying means to carry out a reduction/magnifying of the format of the graphical elements.

For example, the card is divided into 4 zones for four applications (identity, health, licence, loyalty). When one utilisation is favoured or becomes a priority (identity), one selection (more particularly by pressing one zone on the screen), enlarges the selected zone at the expense of the other ones except the priority. Then, a multiple utilisation with the permanent keeping of a display of essential data is possible for each application.

Figure 10:
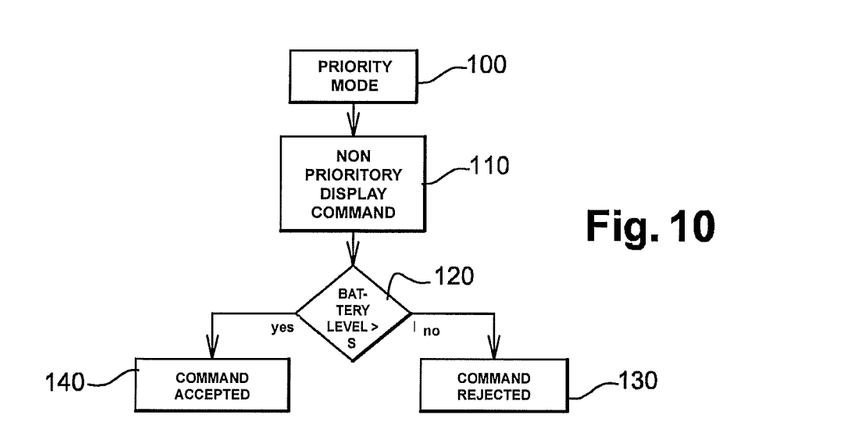
FIGS. 10 and 11 respectively show steps of a method or programme implemented by the object of the invention in case of a priority or non priority display mode.

FIG. 10 illustrates the steps of a method or programme implemented by the invention to hold or to return to a display of priority graphical personalization data under some conditions of use. The condition of use is a level of energy but could be any other criterion making it possible to manage the display of two concurrent documents or applications.

At step 100, the card displays the priority mode such as an identity document although the battery is low;

At step 110, the user interacts to display something else and consequently cancels at least a part of the identity data. For example, a holiday photograph or any other document such as a licence or any other information stored in the memory of the object;

At step 120, in response to the display changing control, the card makes, via the microcontroller, a test of the battery level or a test of the energy level depending on whether the card is connected or supplied or not. A voltage or current measuring circuit is then provided in the card, more particularly in the chip to inform the microcontroller;

At step 130, if the test is negative (insufficient battery level), the display changing control is rejected and the priority mode is kept displayed, more particularly thanks to the E-Paper (electronic paper) technology without any supply of energy;

At step 140, if the test is positive (battery level above the threshold), the display command for another function causes the erasing of priority data and accepted.

Figure 11:
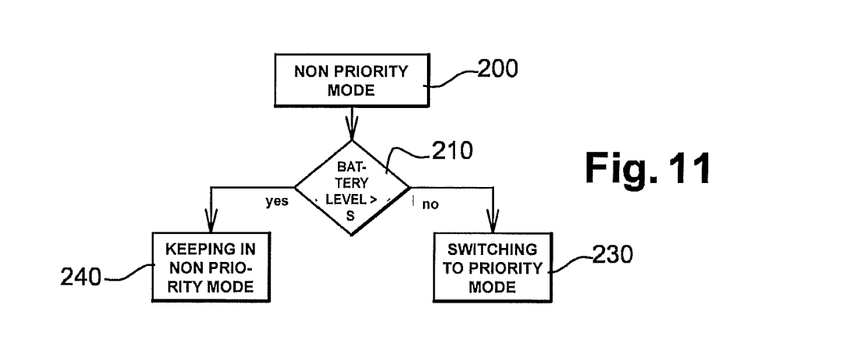

FIG. 11 illustrates steps of a method or a programme implemented by the invention to return to the displaying of priority graphic personalization data under certain conditions of utilisation as mentioned above.

At step 200, the card displays a non priority mode such as the balance of a communication credit whereas the battery is rather low but above the threshold;

At step 210, a test of battery level can be carried out at intervals for example;

At step 230, if the test is negative (battery too low with respect to the threshold) and the card then switches to a priority mode to display again the priority identity document;

At step 240, if the test is positive (battery level much sufficient), the card holds the display or any other utilisation of the display for other purposes than the priority data.

Other advantages or functions are reminded hereinafter:

The invention may always guarantee a minimum display, more particularly on micro windows with displays of the bistable or persistent type, such as an electronic paper (E-Paper);

In case the battery fails or in case there is any other failure and reduced display, only a magnifying means is required to check the documents on an electronic display.

The object may include photovoltaic energy collection means, and a transponder antenna. In case of control using a source of energy, such as a lamp, a radiofrequency driver or terminal, in order to supply energy respectively to photovoltaic cells or to a contactless transponder of the object, the object may be operated and the requested data may be displayed;

In another mode, means for checking the battery level trigger a display mode by default showing predetermined essential graphical data when the level of the battery reaches a threshold;

The display is interactive and more particularly a touch display. This is particularly practical since it makes some surface of the object available for display. On the other hand, it makes it possible, in the previous case of the main windows, to select the graphic to be enlarged at the expense of the other ones by a simple contact or pressure on the corresponding zone;

The interactive aspect of the screen also makes it possible to improve the security of transactions, if any, which uses the display and/or entering of personal data such as the PIN code, the OTP, etc.;

To display the user's picture on the object, a screen and a source of energy of the object are used (a CA current adapter, a USB cable or a battery in a non-connected mode). A file containing the user's picture, i.e. the user whom the object belongs to, shall be stored on the chip card, more particularly during the step of card personalization. The object can then read the information to be displayed on its integrated screen;

The same screen can be used to show any other kind of information: the value of an OTP, a menu, the user's name, the user's identifier, the object identifier, an exchange value, a paid transaction report, etc.;

As the object is often connected to a powered port (for example, USB), the battery of the object can be recharged using the power supply by the port when the object is connected to a computer;

When operated with the battery, the consumption can be optimised, for example by showing the picture only when the user presses a button (in this case, the picture is displayed upon request) or by enabling the photo to be displayed only when the object is in a vertical position (around the user's neck for example in case it is used as a badge) or by enabling the displaying of the picture only when it is connected to a control computer or device;

The portable object can include an interactive screen capable of displaying at least a part of the data useful for the transaction. The data entered by the user can be directly sent from the trustworthy portable object to a trustworthy processing unit, more particularly of the organisation issuing the object or accrediting it. Similarly, the data transmitted from the trustworthy processing unit are directly received by the portable object.

Then, the interactive display, for example the touch display, makes it possible to execute the transaction directly between the chip card and a processing unit by making fraudulent attacks more difficult and thus improving security. If need be, a secured, more particularly a ciphered communication protocol, can be shared by the processor of the object and the processing unit.

In a particularly advantageous embodiment, the screen of the portable object, for example a USB key, is composed itself of a chip card including a display on a surface. The display preferably covers a large part of a front or back face of the card or even the whole of it, while the interface preferably opens in the opposite face.

Interactivity can be obtained, for example by pressure sensors or any other sensor, whether capacitive, resistive or magnetic ones positioned behind or combined with a flexible screen;

Thanks to the invention, the user can thus directly converse with its portable object. The object has the advantage of saving a keyboard or any other man-machine interface and offers a bigger display surface, making the object smaller for example to the UICC or mini SIM format.

The object can be used for executing secured electronic transactions in association with the driver connected to the host computer and connected to a communication network, personal information or information connected to the transaction being transmitted securely onto the sensitive screen of the portable object.

If so required, the portable object includes a programme or a protocol making it possible to converse with a distant unit, more particularly for:

displaying transaction data from a distant unit for approval and/or control by interaction on a zone displayed on the screen;

displaying at least one payment mode and transmit a selected mode by interaction on one zone displayed on the screen;

displaying at least one interactive keyboard for entering a PIN code and transmission for checking the PIN code selected by interaction with the areas displayed on the screen;

displaying at least one writing area and transmitting for checking purposes, writing entering parameters by interaction with the screen. For the electronic transaction, information can preferably be directly transmitted on a network via a secure channel provided between the card and a distant unit connected to a network. Control sets are transmitted by the distant unit and directly interpreted by the card.

Finally, in an embodiment making it possible to intelligently optimise the surface of the object both for displaying and for printing data in the broadest sense (laser-engraved), the fact that OLED or electronic paper layers could be translucent or transparent, more particularly when there is no current is used; the layers 4*a*, 4*b* and/or 6*a*, 6*b* made of such transparent or translucent materials could then include security elements, such as logos, graphics and holograms, guilloches printed or engraved under, in or on at least a layer of the display device.

The marking can be conventionally carried out for reinforcing the security of the card or any other object. Such security elements could be carried out by means such as a personalization laser. Then, the card or medium may include all the conventionally required elements of graphical security on one of its faces (or layers) or visibly through the layers transparency.

The security elements could correspond to a piece of information displayed or be complementary thereto. The security elements marked in the display device compose additional visual elements or electronically displayed graphical elements. Then, for example, the whole or a part of a contour or an element (eyes, nose) of a portrait is laser-engraved on one layer of the display. A part of a letter or a digit or a word is engraved whereas the other part is stored in a secured microcircuit and displayed as a complement to the information marked on the display device. Then, a security matching is made between the display and the chip. This avoids a fraud consisting in substituting a forged element to the one or the other.

The transparent surface of the display device may cover graphics which would then be visible through the display.

Then, the same electronic data display surface can be used opposite the graphical data, more particularly for the personalization through layers of the screen and/or body of the card or a transparent or translucent sheet.

The invention claimed is:

1. A portable device comprising:
   a processor;
   graphical data visible from a face of the portable device,
   an electronic display on which the graphical data can be presented, and
   a display microcontroller that controls the electronic display to operate in a first, priority mode in which the graphical data is presented, and at least one other mode in which other data is presented on the electronic display,
   wherein when the electronic display is not already operating in the first priority mode and upon detection of a predetermined condition, said predetermined condition being at least one of a battery charge state that is less than a predetermined level and a predetermined physical orientation of the portable device, the display microcontroller is configured to
   (1) automatically switch the electronic display to operate in the first, priority mode in which the graphical data is presented, and
   (2) maintain the electronic display to operate in the first, priority mode in which the graphical data is presented by rejecting display mode changing controls if the predetermined condition is still present.

2. The portable device according to claim 1, wherein the portable device is a device for visual authentication of a person, with the graphical data including a photograph of said person.

3. The portable device according to claim 1, wherein the portable device is configured to provide a logical access control function in a communication network and includes access rights for a physical access, via a radiofrequency communication with a driver.

4. The portable device according to claim 1, wherein the graphical data is securely stored in an internal or external storage connected thereto.

5. The portable device according to claim 1, wherein the portable device constitutes an official identification document.

6. The portable device according to claim 1, selected from the group comprising a USB key, a chip card, a personal assistant, and a mobile phone.

7. The portable device according to claim 1, wherein the portable device further configures and detects predetermined conditions including at least one of: a low battery level, a mechanical failure, a vertical position, a micro display or multiple displays, and connection to a source of energy.

8. The portable device according to claim 1, wherein the electronic display is bistable.

9. The portable device according to claim 8, wherein the electronic display comprises electronic paper.

10. The portable device according to claim 1, wherein the electronic display is a touch display.

11. The portable device according to claim 1, wherein the electronic display includes layers with said layers including marked security elements.

12. The portable device according to claim 11, wherein the security elements constitute visual elements complementary to electronically displayed graphical elements.

13. The portable device according to claim 11, wherein the marked security elements are selected from a group consisting of logos, graphics, holograms and guilloches.

14. The portable device according to claim 1, further comprising at least one of the following:
   carrying out of secure electronic transactions in association with a driver connected to a host computer and connected to a communication network, with personal information or information relating to the transaction being securely entered on a touch screen of the portable device;
   a physical access control implementing a double step of control including the user's authentication control by the portable device, by biometry, and a physical access control of access rights contained in the portable device;
   authentication and visual monitoring of at least one person;
   authentication logical access control for at least one user; and
   displaying of the data other than the graphical data.

15. The portable device according to claim 14, wherein, for the electronic transaction, information is transmitted directly on the communication network via a secure channel established between the portable device and a remote unit connected to the communication network.

16. The portable device according to claim 1, wherein the display mode changing controls are user-provided.

17. A device including an interface connected to a display, wherein the display includes a portable device, comprising:
   a processor;
   graphical data visible from a face of the portable device, an electronic display on which the graphical data can be presented, and a display microcontroller that controls the electronic display to operate in a first, priority mode in which the graphical data is presented including an identity document, and at least one other mode in which other data is presented on the electronic display,
   wherein when the electronic display is not already operating in the first priority mode and upon detection of a predetermined condition, said predetermined condition being at least one of a battery charge state that is less than a predetermined level and a predetermined physical orientation of the portable device, the display microcontroller is configured to
   (1) automatically switch the electronic display to operate in the first, priority mode in which the graphical data is presented, and
   (2) maintain the electronic display to operate in the first, priority mode in which the graphical data is presented by rejecting display mode changing controls if the predetermined condition is still present.

18. The device according to claim 17, wherein the display is removable with respect to the device and constitutes at least one of an additional display of the device and a unique display therefor.

19. A method of the graphical personalization of a portable device having an electronic display, said method including:
   operating the electronic display in a first, priority mode in which graphical data is presented on the electronic display of the portable device;
   operating the electronic display in at least one other mode in which data other than the graphical data is presented on the electronic display;
   detecting a predetermined condition, said predetermined condition being at least one of a battery charge state that is less than a predetermined level and a predetermined physical orientation of the portable device; and
   in response to detection of said predetermined condition, when the electronic display is not already operating in the first priority mode,
   (1) automatically switching the electronic display to the first, priority mode in which the graphical data is presented, and
   (2) maintaining the electronic display to operate in the first, priority mode in which the graphical data is presented by rejecting display mode changing controls if the predetermined condition is still present.

20. The method according to claim 19, wherein the display mode changing controls are user-provided.

* * * * *